Figure 1:
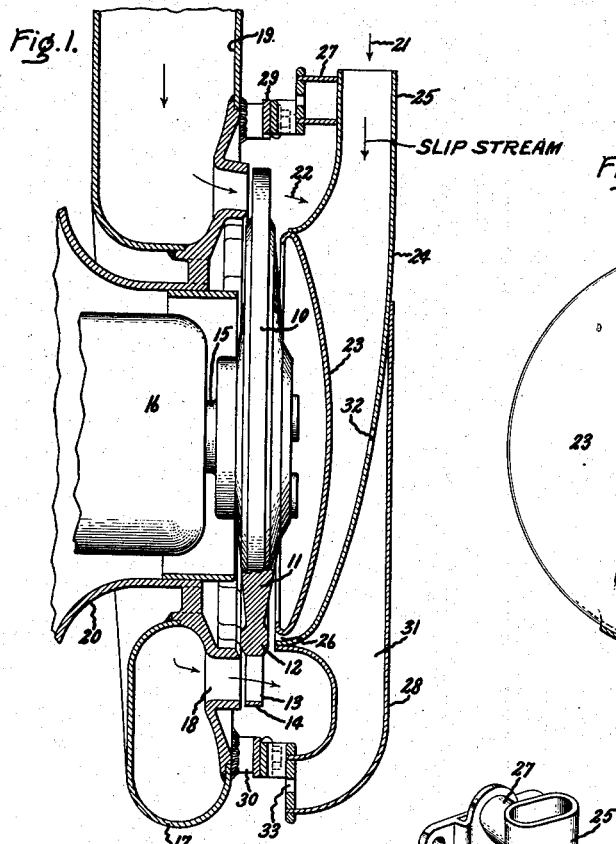

Nov. 28, 1944.  C. W. SMITH  2,364,037
GAS TURBINE ARRANGEMENT
Filed June 28, 1939  4 Sheets-Sheet 1

Inventor:
Chester W. Smith,
by Harry E. Dunham
His Attorney.

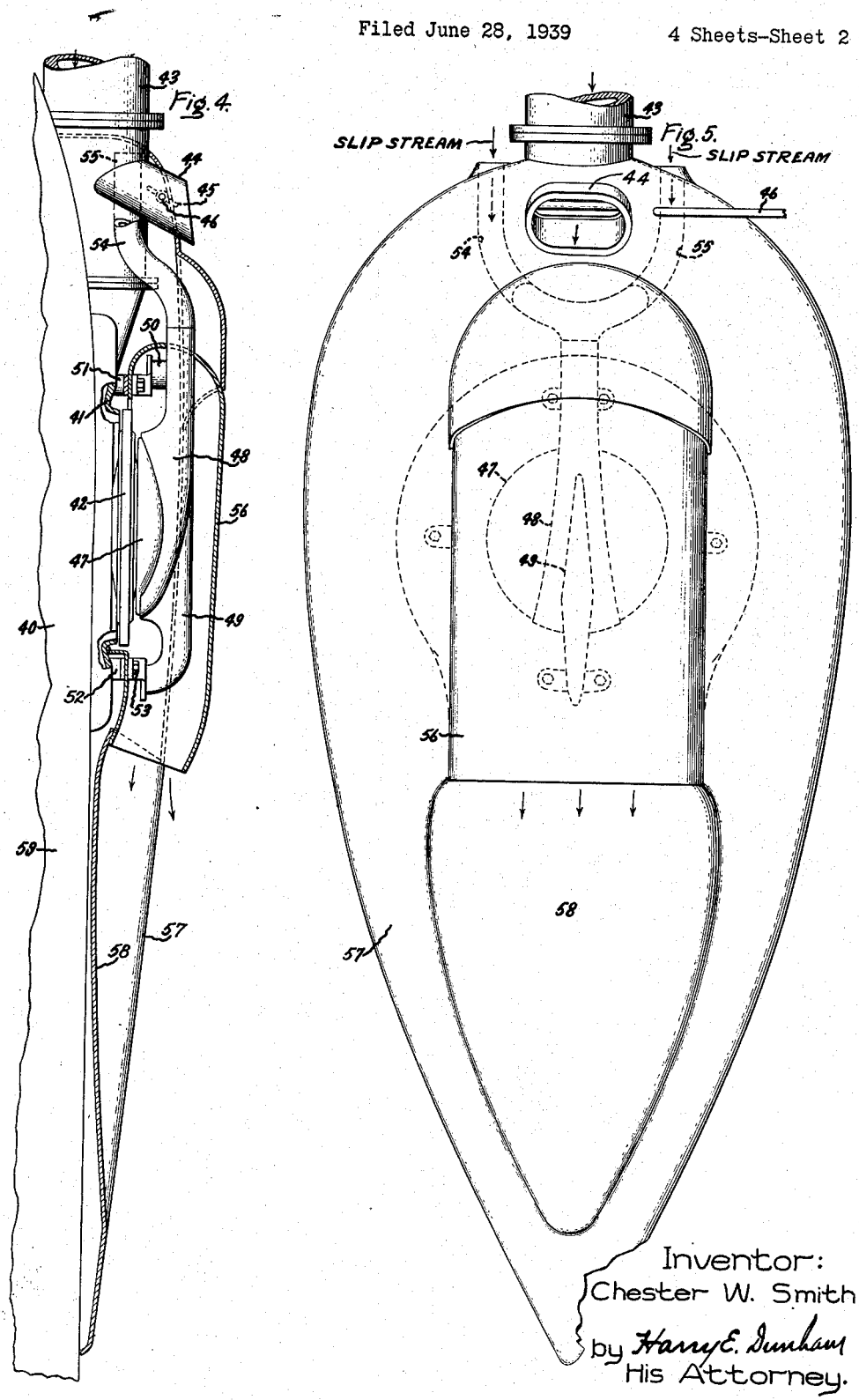

Nov. 28, 1944.  C. W. SMITH  2,364,037
GAS TURBINE ARRANGEMENT
Filed June 28, 1939  4 Sheets-Sheet 3
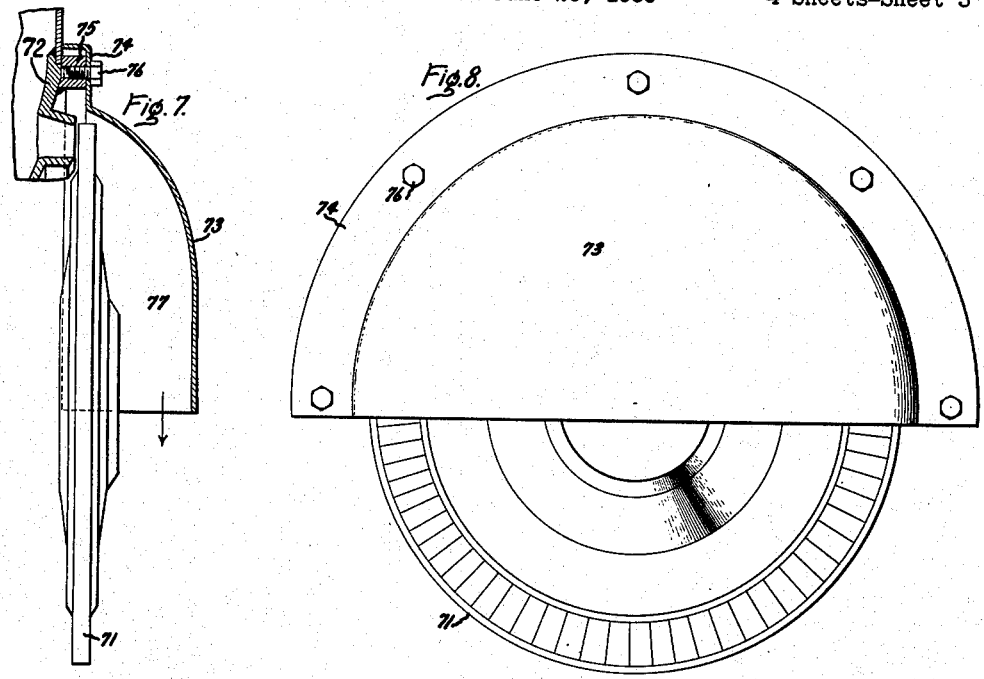
Inventor:
Chester W. Smith,
by Harry E. Dunham
His Attorney.

Nov. 28, 1944.  C. W. SMITH  2,364,037
GAS TURBINE ARRANGEMENT
Filed June 28, 1939   4 Sheets-Sheet 4

Inventor:
Chester W. Smith,
by Harry E. Dunham
His Attorney.

Patented Nov. 28, 1944

2,364,037

UNITED STATES PATENT OFFICE 2,364,037

GAS TURBINE ARRANGEMENT

Chester W. Smith, Lynn, Mass., assignor to General Electric Company, a corporation of New New York Application June 28, 1939, Serial No. 281,562

21 Claims. (Cl. 60—41)

The present invention relates to gas turbine arrangements wherein a turbine having one or more bucket wheels is so located that the exhaust gases issuing from the turbine buckets may sweep across the face of one or more of the wheels, or where one or more of the wheels is exposed to a current of air from the atmosphere or other source which furnishes oxygen for combustion of unburned fuel contained in the gases issuing from such wheel or wheels. The invention is of particular significance in connection with aircraft arrangements in which an axial flow gas turbine wheel is secured to an overhung shaft portion with its outlet side substantially entirely exposed to the atmosphere and having a surface or plane of rotation substantially parallel to the slip stream of the aircraft or from another viewpoint the wheel is mounted with its axis of rotation at an appreciable angle to the direction of the slip-stream. In such an arrangement the gases discharge from the wheel at an angle substantially perpendicular to the direction of the slip stream. Such gas turbines when operated with gases discharged from a combustion engine having temperatures of the order of 1400° F. and above are subject to high temperatures during operation. The high temperatures may considerably weaken the material of the bucket wheel and thereby endanger the safety of the plant.

The high temperatures in arrangements of the kind described above are due essentially to two causes. One cause is the after-burning of gases issued from the bucket wheel in proximity thereto and the other cause is due to the slip stream which forces gases issued from the nozzles and buckets on the upstream side of the bucket wheel towards the central portion thereof.

The object of my invention is to provide improved constructions and arrangements whereby excessive heating of a gas turbine of the type above described is prevented. This is accomplished in accordance with my invention by an arrangement in which the aforementioned causes are substantially eliminated.

For a better understanding of what I believe to be novel and my invention, attention is directed to the following description and the claims appended thereto in connection with the accompanying drawings.

Figure 2:
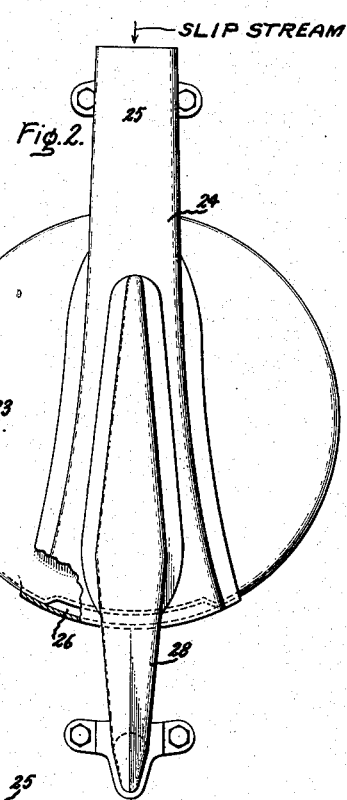
Figure 3:
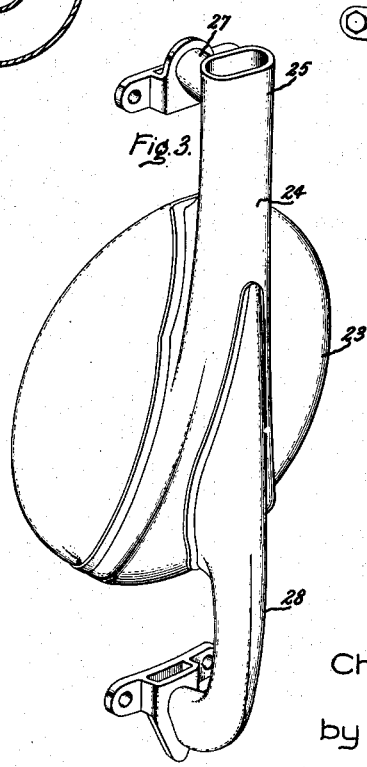

In the drawings, Fig. 1 illustrates a sectional view of a gas turbine arrangement embodying my invention; Fig. 2 is a front view of a part of Fig. 1; Fig. 3 is a perspective view of the part shown in Fig. 2; Fig. 4 is a modification of the arrangement of Fig. 1; Fig. 5 is a front view of Fig. 4; Fig. 6 is a perspective view of an arrangement similar to that of Fig. 1 and Figs. 7, 8, 9, 10, 11 and 12 illustrate further modifications, Figs. 8, 9 and 11 being front views of Figs. 7, 10 and 12 respectively.

A gas turbine arrangement according to my invention, as shown in Figs. 1, 2 and 3, comprises a bucket wheel 10 which has a central solid disk 11 forming a rim 12 and a row of buckets 13 secured to the rim 12. The outer ends of the buckets 13 are connected by a band 14. The bucket wheel is secured to an overhung shaft 15 supported on a bearing 16. An annular nozzle box 17 having a row of blades 18 forming nozzles between them is arranged to supply operating gas to the bucket wheel. The nozzle box has an inlet conduit 19 for connection to a suitable source of supply, such as the manifold of a combustion engine, not shown. A partition or heat-insulating wall 20 is provided between the nozzle box 17 and the bearing 16 to reduce heat transfer from the nozzle box to the bearing. In aircraft such gas turbine may serve to drive a supercharger or a generator, as disclosed, for example, in Patents Nos. 2,117,131, issued May 10, 1938, to C. H. Auger, and 2,180,168, to S. R. Puffer, issued November 14, 1939, and assigned to the same assignee as the present application.

In many installations the turbine is mounted so that the front surface of the bucket wheel is substantially parallel to the direction of the slip stream as indicated by an arrow 21 in the drawings. The direction of the gases issuing from the bucket wheel, as indicated by another arrow 22, is substantially perpendicular to the direction of the slip stream. With regard to the slip stream, the upper portion of the bucket wheel in the drawings constitutes a leading portion or edge and the lower portion of the bucket wheel constitutes a trailing portion or edge. During operation, then, gases discharge from the leading bucket wheel portion are forced towards the bucket wheel disk by the action of the slip stream and cause considerable heating of the disk.

The heating of the bucket wheel disk by gases discharged from the bucket wheel is considerably reduced in accordance with my invention by the provision of a cap 23 arranged adjacent the bucket wheel. In the present instance the cap is concave shaped with a rim bent inward and closely spaced with the adjacent surface of the bucket wheel disk, the spacing from the disk increasing towards the center of the cap. With the provision of such protecting cap, only a small amount, if any, of gas issued from the bucket wheel will be forced through the clearance between the cap and the bucket wheel while the major portion of the gas issued from the leading portion of the bucket wheel is blown towards the outer surface of the cap. Gases forced towards the cap 23 may cause heating of the latter but do not directly heat the bucket wheel as would be the case were no cap provided. Thus, the cap constitutes a device for protecting the bucket wheel disk from the heat of the gases issued from the bucket wheel and forced in the direction of the disk by action of the slip stream. In some cases the provision of the protective cap 23 alone may be sufficient to avoid excessive temperature of the bucket wheel while in other cases positive cooling means for the bucket wheel may be necessary.

In the present example I have shown a positive cooling means including a conduit 24 secured to the cap 23 and extending across a diameter of the latter. The conduit has an inlet portion 25 for receiving cooling air. In the present example the inlet portion 25 has an opening facing in the direction of the slip stream, and extending radially beyond the bucket wheel 10 so that no gas issued from the latter may enter the cooling conduit 24. The conduit 24 together with the cooling cap 23 form a discharge opening 26 in the direction of the trailing rim portion of the bucket wheel and extending over a distance of about 45 angular degrees of the rim. The conduit 24 is streamlined to offer minimum resistance to the slip stream during operation of an aircraft. The cap 23 together with the conduit 24 constitute a device for protecting the bucket wheel from the heat of the gas issuing therefrom and simultaneously supplying a stream of cooling air to the bucket wheel.

The device is suitably supported, preferably on the nozzle box 17. The support in the present instance comprises two brackets 27 and 28 fastened to supports 29 and 30 respectively on the nozzle box 17. At least one of the brackets, in the present instance bracket 28, near the trailing portion of the bucket wheel is air-cooled. The bracket 28 comprises a streamlined conduit 31 secured to the conduit 24, preferably by fusing. The conduit 24 has an opening 32 to admit cooling air from the latter into the bracket 28, whence the cooling air discharges through an opening 33.

Figs. 4 and 5 show an arrangement according to my invention in which the after-burning of gases in proximity to the bucket wheel is substantially entirely eliminated, and in which the protective cover described above is kept at a somewhat lower temperature by means preventing the entire mass of gas issuing from the buckets on the upstream side from being swept across in close contact with it. This is accomplished by the provision of means constraining the gases issued from the bucket wheel in a definite channel with a discharge opening located at a point remote from the turbine bucket wheel, preferably beyond the trailing edge thereof when viewed in direction of the slip stream. More specifically the arrangement of Figs. 4 and 5 comprises a fuselage 40 forming part of an aircraft. A gas turbine having a nozzle box 41 corresponding to box 17 of Fig. 1 and a bucket wheel 42 corresponding to the bucket wheel 10 of Fig. 1 are supported on the fuselage with the major portion of the nozzle box disposed inside the fuselage 40. Operating gas is supplied to the nozzle box 41 by a conduit 43 which has a waste pipe 44 with a waste valve 45 carried on a stem 46. By turning the stem 46, the valve 45 may be closed so that all of the gases are conducted to the nozzle box to do work in the turbine. With the valve 45 in open position, part of the gases flowing through the conduit 43 are wasted into the atmosphere through the waste conduit 44. The arrangement includes a device for protecting the bucket wheel 42 from the heat of the gases discharged therefrom and for cooling the trailing edge of the bucket wheel. This device is similar to that described above and includes a protecting cap 47 corresponding to the cap 23 of Fig. 1 and a streamlined cooling conduit 48 corresponding to the conduit 24 of Fig. 1 and having brackets 49 and 50 secured to supports 52, 51 respectively on the nozzle box by means of bolts 53. The cooling conduit 48 in the present example has branched inlet portions 54 and 55 located on opposite sides of the waste conduit 44 and curved towards the fuselage. The inlets of portions 54, 55 face against the slip stream and are located beyond the outlet opening of the waste conduit 44 so that gases discharged from the latter may not enter the cooling conduits 54, 55. In order to constrain the gases issuing from the bucket wheel and to reduce the effect of the slipsstream on the discharge of gases from the wheel, a shield or flighthood 56 is provided which has an upper curved portion with an edge near the circumferential portion of the bucket wheel and securely held between the support 51 and the bracket 50. A lower portion of the shield 56 forms a conduit and is securely held between the support 52 and the bracket 49. With this arrangement, gases discharged from the leading portion of the bucket wheel do not come into contact with air in proximity of the bucket wheel whereby the danger of afterburning is substantially eliminated. The gases are discharged from the lower conduit portion of the shield at a point remote from the gas turbine proper.

The entire structure may be covered by fairing 57 to reduce the resistance to the slip stream during operation by providing smooth, continuous surfaces blending gradually into the surfaces of adjacent portions of the fuselage. The shape of the fairing then depends upon the location of the gas turbine plant and the shape of adjacent elements. In the present example the fairing forms openings for the waste conduit 44 and the branched inlet portions 54, 55 of the cooling conduit. A portion 58 of the fairing below the shield 56 is depressed to form a discharge path for the exhaust gases, guiding them rearward and outward and discharging them to atmosphere in such a direction that they tend to be carried away from the plane structure. This portion of the fairing blends smoothly and continuously into the rest, and the whole is suitably attached to adjacent portions 59 of the aircraft.

The gas turbine arrangement shown in Fig. 6 is similar to that of Fig. 1. It comprises a nozzle box 60 with an inlet 61 for receiving gases and a turbine wheel 62 with an annular row of buckets 63 forming passages arranged to receive gases from the nozzle box 60. A device comprising a cap 64 with a cooling conduit 65 is disposed adjacent the wheel to prevent overheating thereof. The cooling conduit 65 is fused to the cap 64 and has an inlet portion 66 positioned to receive cooling air from the slip stream. The direction of the slip stream as in all of the drawings is assumed to be in downward direction. The cooling conduit has two brackets 67 and 68 mounted directly on the nozzle box by means of bolts 69. The conduit 65 is streamlined to reduce the resistance to the slip stream during operation.

The arrangement of Figs. 7 and 8 comprises a gas turbine with a bucket wheel 71 mounted similarly to the bucket wheel of Fig. 1, that is, with its axis of rotation perpendicular to the direction of the slip stream and its discharge side exposed to the atmosphere. Operating gas is supplied to the bucket wheel by means of a nozzle box 72. The arrangement includes means forming a smooth discharge path for the gases issuing from the bucket wheel, particularly from the leading portion thereof, and preventing these gases from mixing with air in proximity to the leading portion of the wheel. This means comprises a semi-annular shield 73 which has an outer flanged portion 74 fastened to the nozzle box 72 by means including studs 75 and bolts 76. The shield covers about half of the bucket wheel 71 and is spaced therefrom to form a channel 77 for smoothly discharging the gases in downward direction or, with reference to an aircraft, in rearward direction. During operation no air enters the channel 77 whereby after-burning within the channel is reduced to a minimum. In addition, the shield 73 acts as a deflector for the slip stream, thus preventing the gases issuing from the bucket wheel from being forced with great intensity towards the central portion of the bucket wheel.

Figure 9:
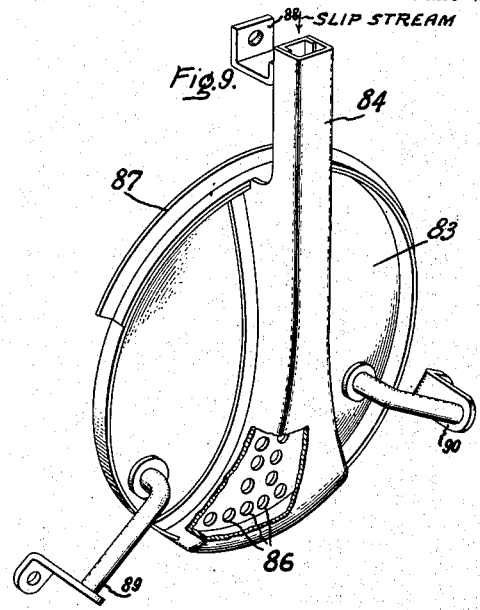
Figure 10:
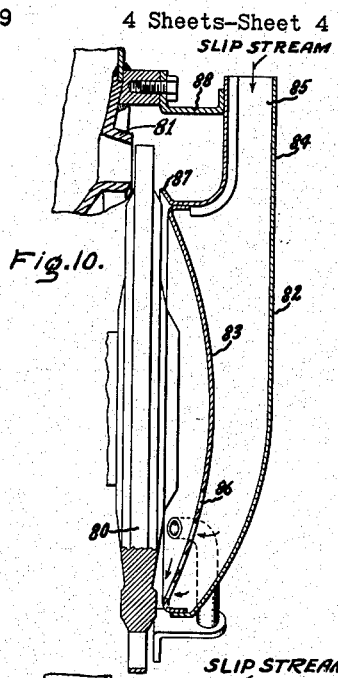

The arrangement of Figs. 9 and 10 comprises a gas turbine having a bucket wheel 80 and a nozzle box 81 corresponding to the bucket wheel 10 and the nozzle box 17 respectively in Fig. 1. The bucket wheel is protected from the heat of the gases issued therefrom and simultaneously cooled by a device 82 located on the side of the wheel opposite the nozzle box and comprising a protecting and cooling cap 83 and a cooling conduit 84 mounted on and partly formed by the cap 83. The conduit 82 extends across a diameter of the cap or disk 83 and has an inlet portion 85 positioned to receive cooling air from the slip stream. In the present instance this cooling air is discharged towards the trailing portion of the bucket wheel disk through a plurality of openings 86 extending over a sector of about 45 angular degrees of the lower portion of the cap 83. The major portion of the cooling air thus forced towards the bucket wheel passes downward to be discharged through the clearance formed between the cooling cap and the trailing portion of the bucket wheel. A sealing strip 87 extending over about 120 angular degrees and in the present instance integrally formed with a wall of the conduit 84 is provided substantially to prevent the flow under the cooling cap 83 both of hot exhaust gases from the upstream side of the wheel and of cooling air containing oxygen which might combine with unburnt fuel and burn underneath the cap 83. The strip as shown is arranged preferably perpendicular to the plane of the wheel and extending over a substantial portion of the circumference thereof to define a sharp-edged orifice around the wheel which is less conducive to flow of gas and air under the hood than a smooth-approach orifice. The device is supported on the nozzle box by means of three brackets, an upper bracket 88 fused to the inner portion 85 of the cooling conduit and lower brackets 89 and 90. The latter include hollow portions directly fastened to the cap 83 and in the present instance communicating with the space formed between the cap and the bucket wheel to receive some cooling air therefrom. The brackets 88, 89 and 90 are unsymmetrically mounted with respect to the cap 83 to prevent synchronous vibration in the buckets or disk due to the impulses which would be received at regular and equal intervals by a bucket or a portion of the disk passing under brackets equally spaced.

Figure 11:
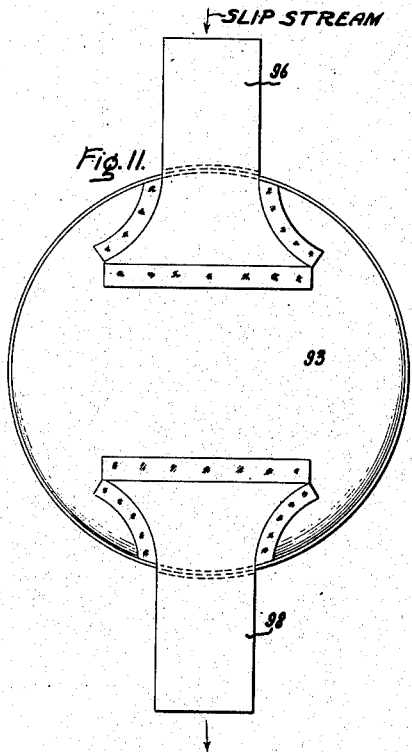
Figure 12:
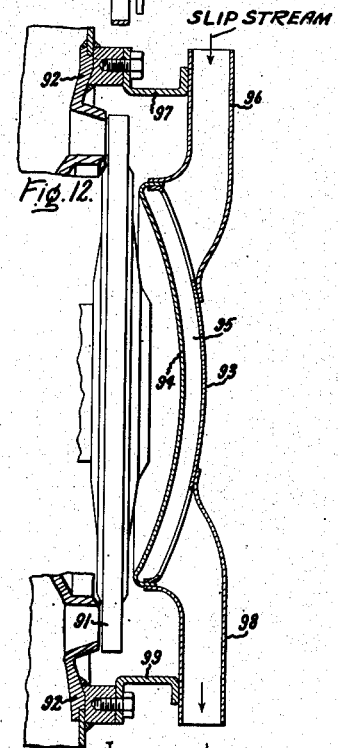

The arrangement of Figs. 11 and 12 comprises a gas turbine including a bucket wheel 91 and a nozzle box 92 corresponding to elements 10 and 17 of Fig. 1. Excessive heating of the turbine wheel 91 is prevented by a device 93 which comprises a hollow double walled disk-shaped cap 94 with the outer edges of the two walls fused together to form a space 95. Cooling air is conducted to the space 95 by means of an inlet conduit 96 arranged to receive air from the slip stream and supported on the nozzle box 92 by a bracket 97. The cooling air is discharged from the space 95 by an outlet conduit 98 supported by a bracket 99 on the nozzle box. As pointed out in connection with Fig. 1, the cooling cap itself forms a protection for the bucket wheel in that it prevents gases issued therefrom from being forced towards the central portion of the wheel by the action of the slip stream. At the same time, however, the protecting cap may reduce radiation of heat from the bucket wheel, the radiation depending upon the temperature of the cap. To maintain the radiation high it becomes desirable to cool the cap which is heated by the gases issued from the wheel and forced against the outer surface of the cap by the slip stream. This cooling of the cap is accomplished by the present arrangement where the inner disk of the cap of the device 93, that is, the disk adjacent the bucket wheel, is effectively cooled by the continuous flow of air through the space 95.

What I claim as new and desire to secure by Letters Patent of the United States is:

1. Gas turbine arrangement for aircraft comprising a bucket wheel having a row of buckets arranged to discharge directly into the atmosphere in a direction perpendicular to the direction of the slip stream, and a protecting device adjacent the central portion of the outlet side of the bucket wheel to prevent the slip stream from forcing gases issued from the leading portion of the bucket wheel against the central portion of the wheel, said device including means for forcing a cooling medium towards a trailing portion of the wheel.

2. Gas turbine arrangement for aircraft comprising a bucket wheel having a row of buckets arranged to discharge directly into the atmosphere in a direction perpendicular to the direction of the slip stream, and a cap having a concave shape when viewed from the bucket wheel and being closely spaced with the wheel whereby gases issued from the wheel may not be forced towards the central portion thereof by the action of the slip stream, and means associated with the cap for forcing a stream of cooling medium towards the roots of the buckets near the trailing portion of the wheel.

3. Gas turbine arrangement for aircraft comprising a nozzle box, an axial flow turbine wheel having a row of bucket blades arranged to receive gases from the box and having an axis of rotation substantially perpendicular to that of the slip stream, means protecting the central portion of the wheel from the heat of the gases discharged from the leading portion of the wheel, said means comprising a cap adjacent the central portion only of the wheel and concave-shaped towards the wheel and air cooled brackets supporting the cap on the nozzle box.

4. Gas turbine arrangement for aircraft comprising a turbine wheel arranged to rotate about an axis substantially perpendicular to the direction of the slip stream, a nozzle box on one side of the wheel for conducting gases thereto, the other side of the wheel being exposed to the atmosphere, nozzle means for directing a stream of cooling air towards the trailing portion only of the central part of the wheel on said other side, and means for protecting the remaining portion of the central part of the wheel from gases discharged therefrom.

5. Gas turbine arrangement for aircraft comprising a turbine wheel having a rim and being mounted with its axis of rotation substantially perpendicular to the direction of the slip stream, and a device forming a nozzle with an opening extending over a short circumferential portion only of the rim for forcing a jet of cooling air toward the rim the nozzle being directed towards a trailing portion only of the wheel to preclude after-burning of gases in proximity to the wheel.

6. Gas turbine arrangement for aircraft comprising a turbine wheel, a nozzle box for conducting gases to one side of the wheel, the other side of the wheel being free to discharge directly to the atmosphere in a direction substantially perpendicular to that of the slip stream, and a cooling device located on the other side of the wheel for protecting the other side of the wheel from excessive heat comprising a cap closely spaced with the central portion of the wheel and a conduit secured to the cap and having an inlet arranged to receive cooling air from the slip stream and a discharge opening in proximity to a trailing portion only of the wheel to cool the latter.

7. Gas turbine arrangement for aircraft comprising a turbine wheel, a nozzle box for conducting gases to one side of the wheel, the other side of the wheel being free to discharge directly to the atmosphere in a direction substantially perpendicular to that of the slip stream, and a device protecting the other side of the wheel from excessive heat, said device comprising a cap concave-shaped towards the wheel and closely spaced therewith and a cooling conduit extending across a diameter of the cap and having an inlet for receiving cooling air and a discharge opening in proximity to a trailing portion only of the wheel.

8. Gas turbine arrangement for aircraft comprising a turbine wheel, a nozzle box for conducting gases to one side of the wheel, the other side of the wheel being free to discharge directly to the atmosphere in a direction substantially perpendicular to that of the slip stream, and a device protecting the other side of the wheel from excessive heat, said device comprising a cap closely spaced with the wheel, a cooling conduit partly formed by and extending across a diameter of the cap and having an inlet for receiving cooling air and a discharge opening in proximity to a trailing portion only of the wheel, and brackets secured to the conduit for supporting the device on the nozzle box.

9. Gas turbine arrangement for aircraft comprising a turbine wheel, a nozzle box for conducting gases to one side of the wheel, the other side of the wheel being free to discharge directly to the atmosphere, and a device protecting the wheel from excessive heat, said device comprising a cap concave-shaped towards the wheel and closely spaced therewith, a cooling conduit extending across a diameter of the cap and having an inlet for receiving cooling air and discharging towards the trailing portion of the wheel, and brackets supporting the device on the nozzle box, one of the brackets having a hollow portion in communication with the conduit to receive cooling air therefrom.

10. A device for cooling gas turbine bucket wheels comprising a cap, and a streamlined cooling conduit partly formed by and extending across a diameter of the cap and having an inlet for receiving cooling air and a discharge opening extending over a relatively short section adjacent the circumference of the cap to discharge cooling medium towards the rim of such wheel.

11. A device for cooling gas turbines comprising a cap, a streamlined cooling conduit extending across a diameter of the cap and having an inlet for receiving cooling air and a discharge opening near the circumference of the cap, and a support comprising a hollow bracket communicating with the conduit to receive cooling air therefrom.

12. Gas turbine arrangement for aircraft comprising a turbine wheel having a rim and an axis of rotation substantially perpendicular to the direction of the slip stream, a nozzle box for supplying gases to one side of the wheel, a device adjacent the other side of the wheel and supported on the nozzle box to protect the wheel from the heat of the gases issuing therefrom and to supply a stream of cooling air towards a trailing rim portion only of the wheel, the device comprising a disk covering a central portion of the wheel and a conduit secured to the disk and having an inlet opening for receiving cooling air and a discharge opening in proximity to a trailing rim portion, and a shield supported on the nozzle box and defining a smooth discharge channel for the gases issuing from the wheel with an opening to the atmosphere remote from the wheel in direction of the slip stream to prevent after-burning.

13. Gas turbine arrangement for aircraft comprising a turbine wheel, a nozzle box located on one side of the wheel for conducting gases thereto, the wheel having an axis of rotation substantially perpendicular to the direction of the slip stream, a device on the other side of the turbine wheel for directing a stream of cooling air towards a trailing portion only of the wheel, a shield secured to the nozzle box and substantially enclosing the wheel and the device to reduce after-burning of gases in proximity to the wheel, the shield forming a discharge opening to atmosphere beyond the trailing rim portion when viewed in direction of the slip stream, and fairing partly formed by the shield to reduce resistance to the slip stream.

14. Gas turbine arrangement for aircraft comprising a turbine wheel having an axis of rotation substantially perpendicular to the slip stream, a nozzle box having an inlet conduit with a waste gate, a device having a branched inlet conduit with the branches located on opposite sides of said nozzle box inlet conduit for directing a stream of cooling air towards a trailing portion of the wheel, a shield secured to the nozzle box and substantially enclosing the device to reduce afterburning in proximity to the wheel, and fairing partly formed by the shield and defining openings for said branched conduit.

15. Gas turbine arrangement for aircraft comprising a turbine wheel having an axis of rotation substantially perpendicular to the slip stream, and a device to prevent excessive heating of the wheel by the gases issuing therefrom and to cool a trailing portion of the wheel, said device comprising a cap adjacent the wheel, a cooling conduit secured to the cap with an inlet for receiving cooling air, the cap having a plurality of openings extending over about 45 angular degrees near the trailing portion of the wheel to discharge cooling air to said portion, and a plurality of unsymmetrically disposed supporting brackets secured to the device.

16. Gas turbine arrangement for aircraft comprising a turbine wheel having an axis of rotation substantially perpendicular to the direction of the slip stream, and a device for cooling the wheel comprising a cap adjacent the wheel and concave-shaped towards the wheel with a plurality of openings near the trailing portion of the wheel, a cooling conduit extending across a diameter of the cap with an inlet arranged to receive cooling air from the slip stream for forcing cooling air through said openings towards the trailing portion of the wheel, and a sealing strip secured to the cap and the conduit near the leading portion of the wheel.

17. A device for cooling gas turbines comprising a cap, a cooling conduit extending across a diameter of the cap and having an inlet for receiving cooling air and a discharge opening near the circumference of the cap, and a support comprising a hollow bracket communicating with the conduit to receive cooling air therefrom.

18. Gas turbine arrangement for aircraft comprising a bucket wheel having a disk with a rim and a row of buckets secured to the rim, a bearing and a shaft supported on the bearing and having an overhung portion secured to the wheel, the shaft being mounted with its centerline substantially perpendicular to the direction of the slipstream, means located on the bearing side of the wheel and forming a row of nozzles for conducting operating gases to the wheel, and a device located on the discharge side of the wheel for protecting and cooling it, said device comprising a cap adjacent the disk and having an edge closely spaced with said rim to reduce heating of the disk by the gases issuing from the wheel and a conduit having an inlet for receiving cooling air and means formed at least partly by the cap and the conduit to define an outlet opening in proximity to the rim.

19. Gas turbine arrangement for aircraft comprising an axial flow bucket wheel having a disk with a rim and a row of buckets secured thereto, a bearing and a shaft supported on the bearing and having an overhung portion secured to the wheel, means located on the bearing side of the wheel and forming a plurality of nozzles for directing operating gases to the wheel, a shield at least partly enclosing the wheel and forming a rearward discharge opening for gases issuing from the wheel, and a device for protecting and cooling the disk comprising an annular member adjacent the disk and having an edge closely spaced with the rim to prevent gases issuing from the wheel from heating the disk and conduit means for forcing a stream of cooling air towards a portion only of the rim nearest the discharge opening of the shield to keep at a minimum afterburning of gases in proximity to the wheel.

20. Gas turbine arrangement for aircraft comprising a turbine wheel having a rim and a row of buckets mounted on the rim, means mounting the wheel with its axis of rotation at an appreciable angle to the direction of the slipstream, and a device having a wall closely spaced with the rim to reduce the flow of gases issuing from the wheel towards the central portion thereof and means forming a nozzle opening extending over a short circumferential area only of the trailing portion of the rim for forcing a jet of cooling medium towards the rim without causing excessive after-burning of gases issuing from the wheel in proximity to the wheel.

21. Gas turbine arrangement for aircraft comprising a turbine wheel having a rim and a row of buckets mounted on the rim, means mounting the wheel with its axis of rotation at an appreciable angle to the direction of the slipstream, a shield adjacent the leading portion of the wheel to reduce the effect of the slipstream on gases issuing from the wheel, and means for cooling the wheel comprising a conduit having an opening for receiving cooling air and forming a discharge nozzle in proximity to a trailing portion only of the rim to keep after-burning of gases in proximity to the wheel at a minimum.

CHESTER W. SMITH.